(12) United States Patent
Andersen et al.

(10) Patent No.: US 6,516,914 B1
(45) Date of Patent: Feb. 11, 2003

(54) INTEGRATED VEHICLE SUSPENSION, AXLE AND FRAME ASSEMBLY

(75) Inventors: Gordon K. Andersen, Pine River, WI (US); Brian K. Anderson, Oshkosh, WI (US); Christopher K. Yakes, Oshkosh, WI (US); Jon J. Morrow, Neenah, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

(21) Appl. No.: 09/635,791

(22) Filed: Aug. 11, 2000

Related U.S. Application Data

(63) Continuation-in-part of application No. 09/232,596, filed on Jan. 19, 1999, now Pat. No. 6,105,984, which is a continuation of application No. 09/123,804, filed on Jul. 28, 1998, now abandoned, which is a continuation of application No. 08/681,239, filed on Jul. 22, 1996, now Pat. No. 5,820,150, which is a continuation-in-part of application No. 08/421,995, filed on Apr. 14, 1995, now Pat. No. 5,538,274, which is a continuation of application No. 08/046,623, filed on Apr. 14, 1993, now abandoned.

(51) Int. Cl.[7] .......................... B60G 3/20; B60G 11/14; B60K 17/30
(52) U.S. Cl. ...................... 180/360; 180/312; 280/788; 280/124.109; 280/124.136; 280/124.179
(58) Field of Search ................................ 180/312, 311, 180/359, 360; 280/788, 124.109, 124.156, 124.136, 124.138, 124.139, 124.141

(56) References Cited

U.S. PATENT DOCUMENTS

| | | | | |
|---|---|---|---|---|
| 2,278,303 A | * | 3/1942 | Blaser | 280/124.156 |
| 3,243,007 A | * | 3/1966 | Berckhan | 280/788 |
| 3,441,289 A | * | 4/1969 | Frantz et al. | 280/788 |
| 4,813,704 A | * | 3/1989 | Smith | 280/788 |
| 4,848,789 A | * | 7/1989 | Timoney et al. | 280/124.138 |
| 4,943,081 A | * | 7/1990 | Golpe | 280/124.109 |
| 5,915,727 A | * | 6/1999 | Bonnville | 280/788 |

* cited by examiner

*Primary Examiner*—Peter C. English
(74) *Attorney, Agent, or Firm*—Baker & McKenzie

(57) ABSTRACT

An integrated assembly for large vehicles including independent suspension components, supporting side plates and axle and frame components. Each of the side plates is a weldment in which the main part is a series of metal plates formed by bending a single sheet. Pockets are formed on the outside surfaces of the side plates. The pockets support the upper ends of suspension components, i.e., a coil spring, a shock absorber and a jounce bumper, while the lower ends of the suspension components are carried by a lower control arm. The half-shafts of each axle, extend through the side plates which are carried by two C-shaped main frame members.

13 Claims, 15 Drawing Sheets

INTEGRATED VEHICLE SUSPENSION, AXLE AND FRAME ASSEMBLY

This application is a continuation-in-part of application Ser. No. 09/232,596, filed Jan. 19, 1999, now U.S. Pat. No. 6,105,984, which is a continuation of application Ser. No. 09/123,804, filed Jul. 28, 1998, now abandoned, which is a continuation of application Ser. No. 08/681,239, filed Jul. 22, 1996, now U.S. Pat. No. 5,820,150, which is a continuation-in-part of application Ser. No. 08/421,995, filed Apr. 14, 1995, now U.S. Pat. No. 5,538,274, which is a continuation of application Ser. No. 08/046,623, filed Apr. 14, 1993, now abandoned. The text and drawing of the foregoing U.S. Patents are incorporated herein by reference.

BACKGROUND AND SUMMARY OF THE INVENTION

The present invention relates to large vehicles having independent suspensions, such as those which are typically used in military applications and in large municipal vehicles, such as fire trucks. In particular, the invention relates to a frame and independent suspension assembly which allows a vehicle to have better stability by lowering the center of gravity, and better visibility, because a lower drivetrain and hoodline are made possible by providing more room between the main longitudinal members of the vehicle frame.

Military and other emergency vehicles must be designed to extremely demanding specifications. The vehicles must be capable of driving over or through obstacles which only a tactical or emergency operator would attempt. The vehicles must be able to endure corrosive, partially submerged and frequently dirty environments, such as standing water, chemicals or deep mud.

In addition, it is desirable for such vehicles to provide maximum forward visibility and maximum load carrying capacity. One step which has been taken in the design of heavy duty vehicles has been to utilize C-shaped channels as the main frame members. The use of two widely-spaced beams provides a space where various engine, transmission and other essential components can be mounted. Making more space available along the center line of the vehicle frame allows heavy components to be more effectively mounted at a lower elevation which, in turn, lowers the vehicle's center of gravity. Vehicles with low centers of gravity have improved stability. A lower center of gravity in a vehicle provides improved resistance to overturning as the vehicle traverses rough terrain or maneuvers around obstacles at high rates of speed. The improved visibility that results from the lowering of a vehicle's drive train and hoodline allows for safer operation of the vehicle. While the present invention has particular application in the context of frame members which are C-shaped, the invention may be used with frame members having other shapes, such as tubular shapes (rounded and rectangular) and other structurally advantageous shapes.

The present invention provides a vehicle with a lower center of gravity, both with respect to vehicle components and with respect to cargo areas. These and other advantages are accomplished by using weldments which attach to and reach under the main frame members. The weldments include opposing side plates. Each side plate has two buttress-type end plates which support a main side plate member. The main side plate members are comprised of four generally rectilinerally oriented and integrally formed plates. Small buttress plates are used to define pockets for suspension components, such as a suspension spring and shock absorber. The weldments may include a pocket for a sway bar bushing and an opening which allows a sway bar to pass through the pair of weldments. A non-contact spring guide may be mounted inside a suspension coil spring. The spring and spring guide are mounted between a lower control arm and a bearing plate carried by the front weldment of the present invention. The spring guide cooperates with a spring guide bushing, which is also carried by the bearing plate and which extends into the interior of tie coil spring, Other features and advantage of the present invention will be better understood upon a reading of the following specification, read together with the accompanying drawings, wherein:

DETAILED DESCRIPTION OF THE INVENTION

Figure 1:
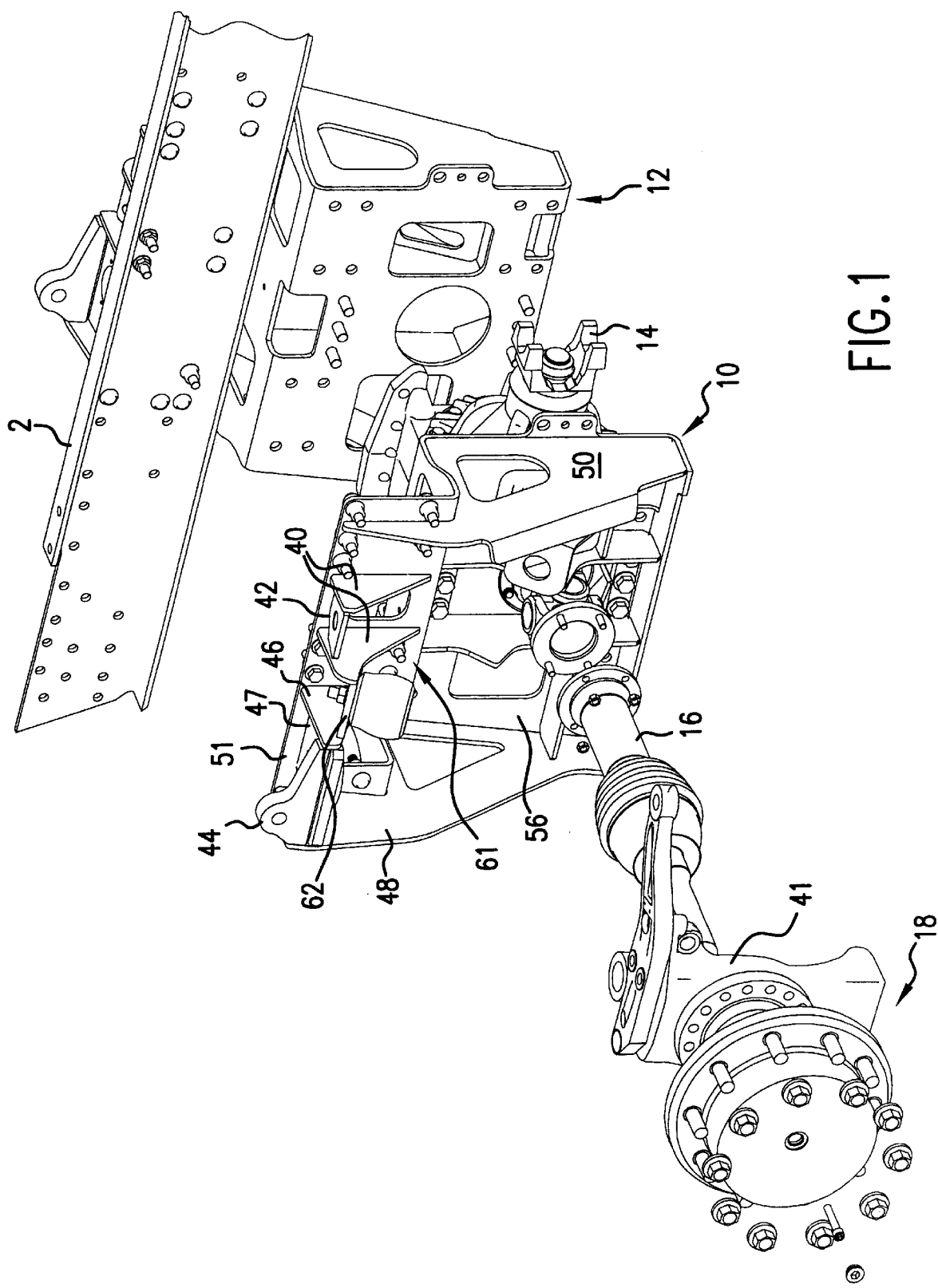
FIG. 1 is a perspective view of a pair of front weldments and portions of a front axle constructed in accordance with the present invention.

FIG. 1 shows the front portion of a vehicle and its suspension support in relation to a frame rail 2 of a vehicle. A left-hand or first side plate 10 is mounted beneath a left-hand frame rail (not shown), and a right-hand or second side plate 12 is mounted beneath a right-hand frame rail 2. Several bolts are used to connect each of the side plates 10 and 12 to its respective frame rail. A differential 15 with a differential drive connection 14 is connected to each of the side plates 10 and 12. As further shown in FIGS. 2 and 3, it is clear that the side plates 10 and 12 are rigidly joined together by the lower plate 20, bar 22 and differential 15 at the lower portions of the side plates 10 and 12. This connection with lower plate 20 and bar 22 form a direct and rigid connection between the two side plates 10 and 12. The side plates shown in FIGS. 1 through 6 are for a suspension that is not equipped with an anti-sway bar.

Referring now to the first plate 10 shown in FIGS. 1 through 6, it is comprised of three main components which are welded together. Those components are: a longitudinally extending main plate member 51; a leading end plate 48; and a trailing end plate 50. Longitudinally extending plate member 51 is a single stamping that includes four sections: an upper vertical plate section 52; a horizontal plate section 54, also referred to as a connecting plate; a lower vertical plate section 56; and a lower lip 58. The upper vertical plate section 52 and the lower vertical plate section 56 are in an off-set and generally parallel relationship, whereas upper vertical plate section 52 and lower vertical plate section 56 may be referred to as first and second mounting plates. Extending from the outer face of the upper vertical plate section 52 are three pockets including a shock absorber pocket 38 formed by gusset plates 40 and a bearing plate 42, a jounce bumper pocket 61 formed by gusset plates 40 and 46 and jounce bumper plate 62, and a coil spring pocket 39, defined by the end plate 48, gusset plate 46 and coil spring bearing plate 47. A lifting lug 44 may be welded to the bearing plate 47 for use in lifting the complete vehicle. The lower vertical plate section 56 has an opening 70 so that a driveshaft, in the form of a halfshaft 16, can extend from the differential 15 to the wheel end 18 (see FIG. 1).

Figure 2:
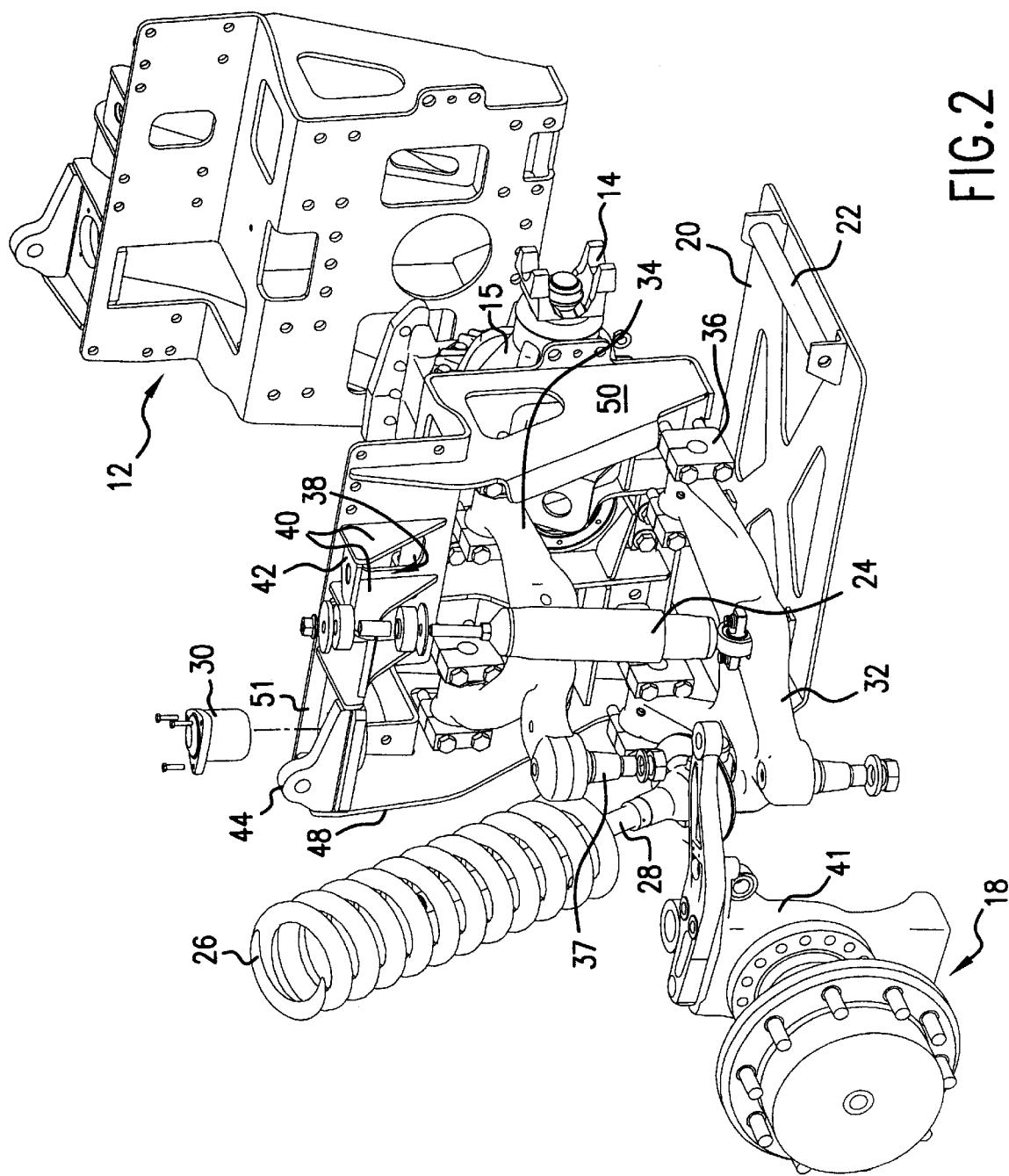
FIG. 2 is a second perspective view of the weldments shown in FIG. 1 with other suspension components shown adjacent thereto.

As is most clearly shown in FIG. 2, the elements of the suspension system are connected to the outer portions of the first side plate 10. The shock absorber 24 extends from the bearing plate 42 to the lower control arm 32. Similarly, the suspension coil spring 26 extends from the lower control arm 32 to the bearing plate 47. In addition, inside the suspension coil spring 26, a spring guide 28 extends from the lower control arm 32 into the spring guide bushing 30 which is bolted to the coil spring bearing plate 47. An upper control arm 34 is connected by a ball joint 37 to an upper portion of the steering knuckle 41. The upper and lower control arms 34 and 32, respectively, are held in place by four control arm mounting assemblies 94, an example of which is more clearly shown in FIG. 10 discussed below. The locations of the control arm mounting assemblies for a left-hand side plate 10 can best be seen in FIG. 4 wherein upper control arm attachment locations 68 and lower control arm attachment locations 66 are at upper and lower portions of the vertical mounting plate 56. An ear 78 is used to support various system lines, i.e., hoses and wires, etc., which lead to the wheel end 18. A stiffening flange 60 extends from the outer edge of the end plate 50 to provide the plate 50 with increased resistance to buckling.

Figure 6:
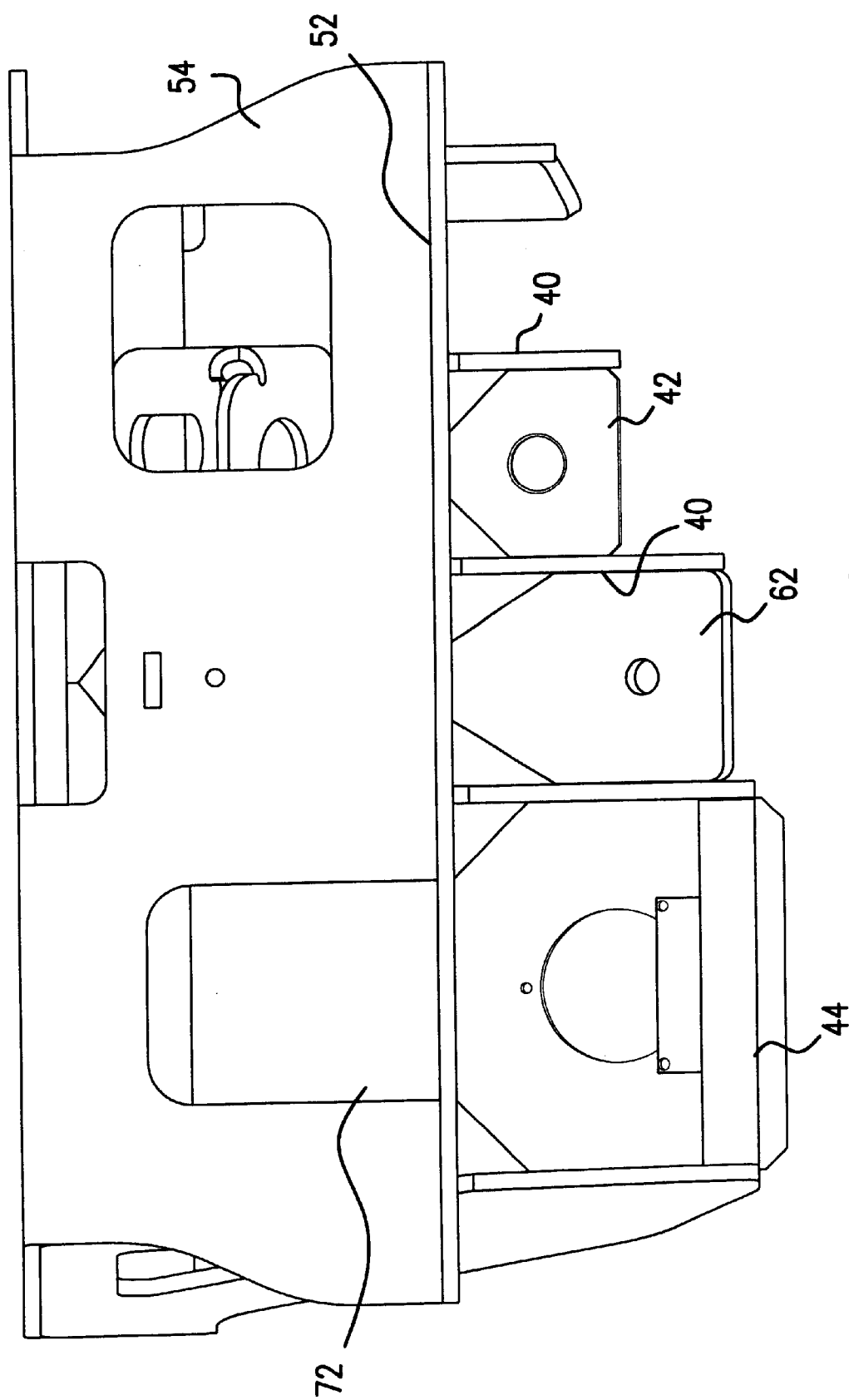
FIG. 6 is a top plan view of the weldment shown in FIGS. 4 and 5.
Figure 7:
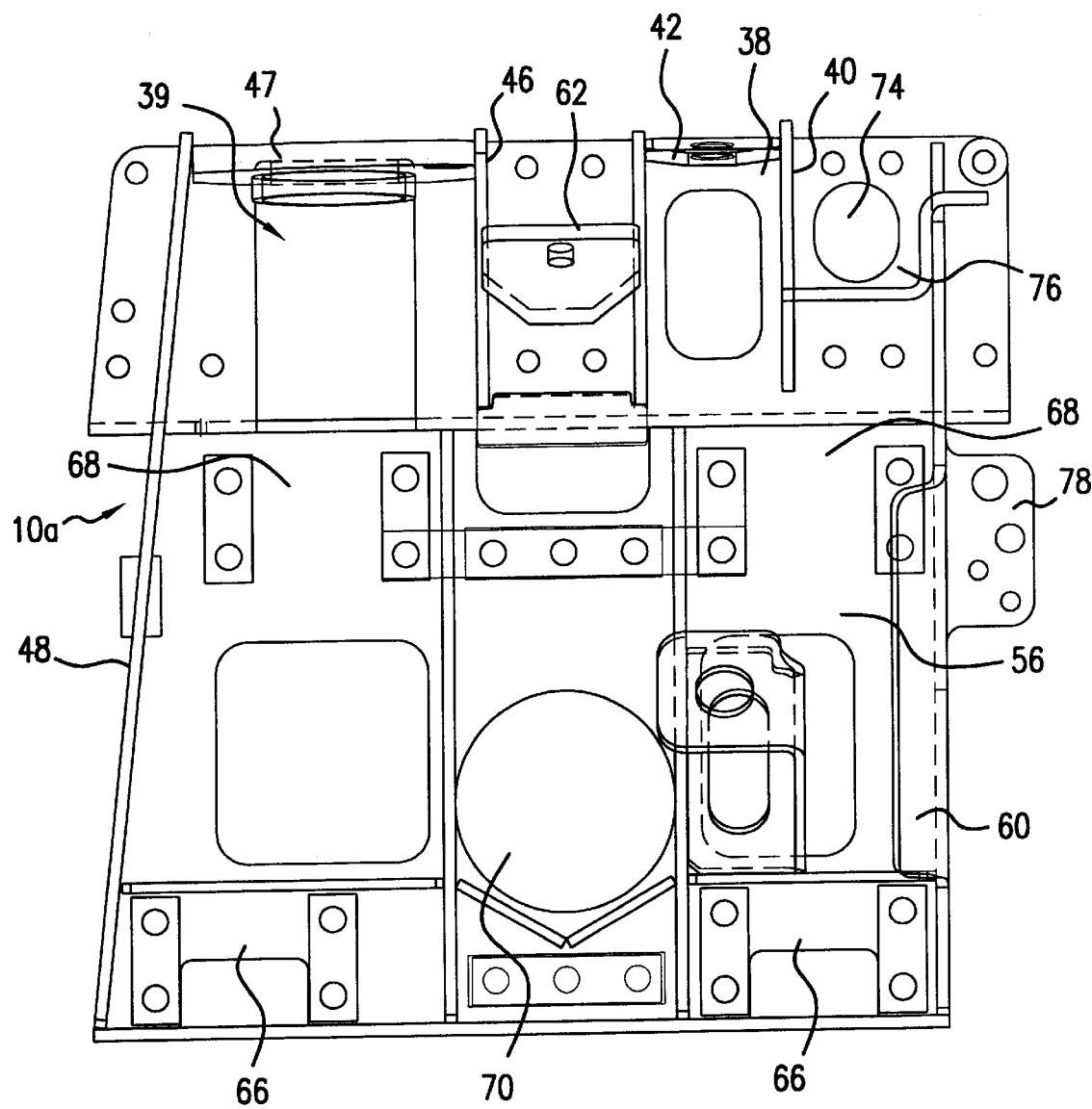
FIG. 7 is side-elevational view of a rear left-hand weldment of the present invention, as configured for use with an anti-sway bar.
Figure 8:
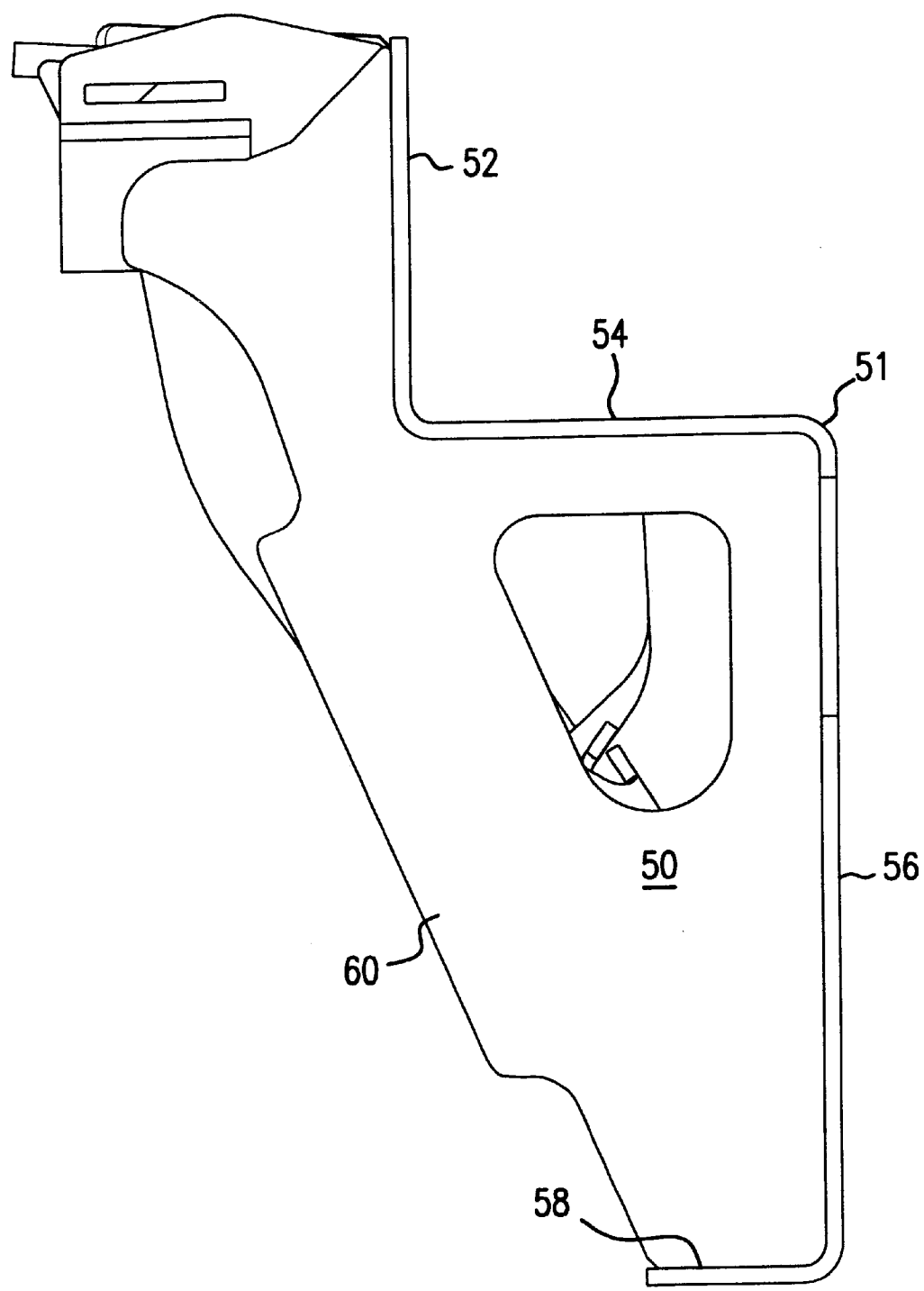
FIG. 8 is an end view of the weldment shown in FIG. 7.
Figure 9:
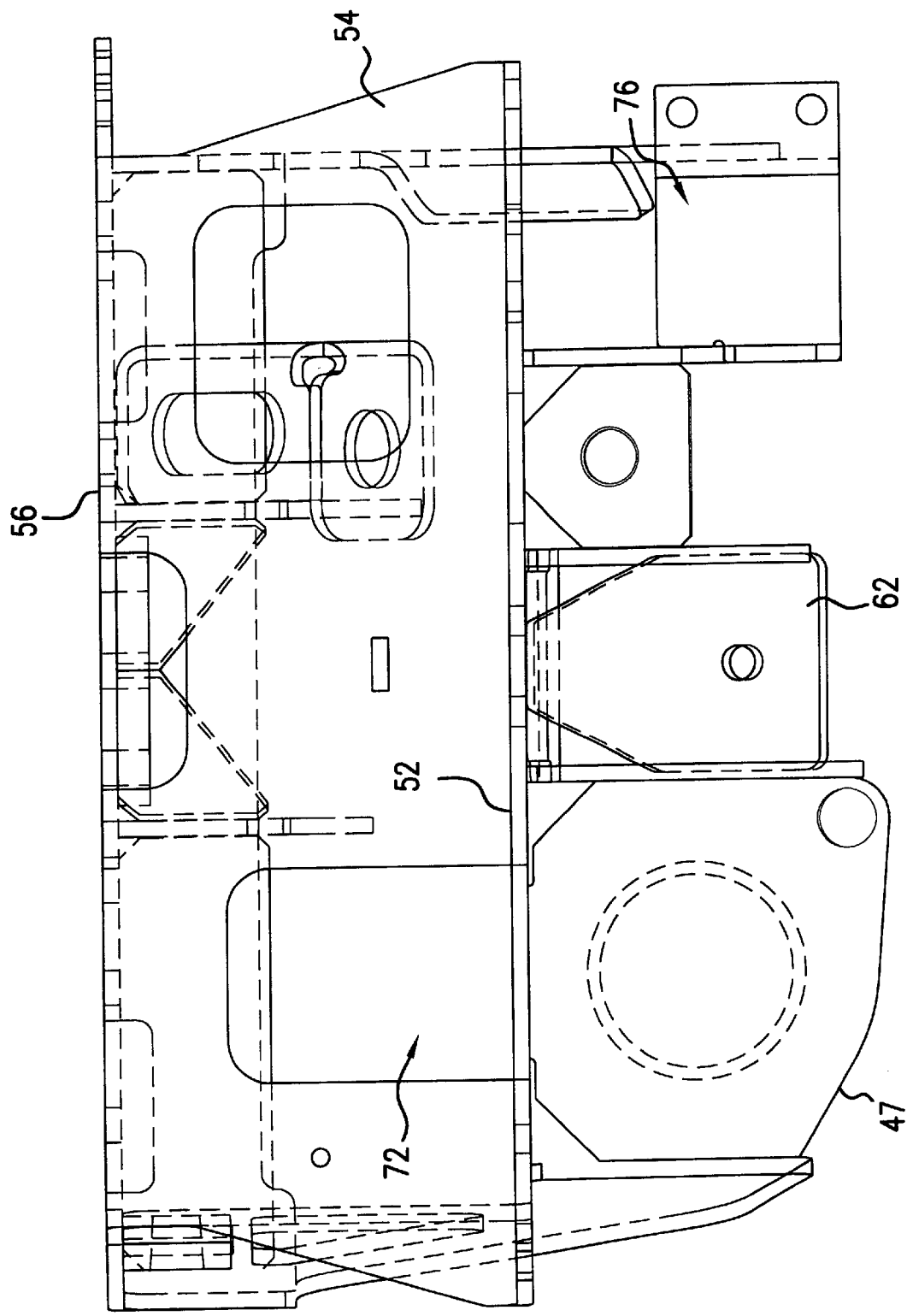
FIG. 9 is a top plan view of the weldment shown in FIGS. 7 and 8.
Figure 12:
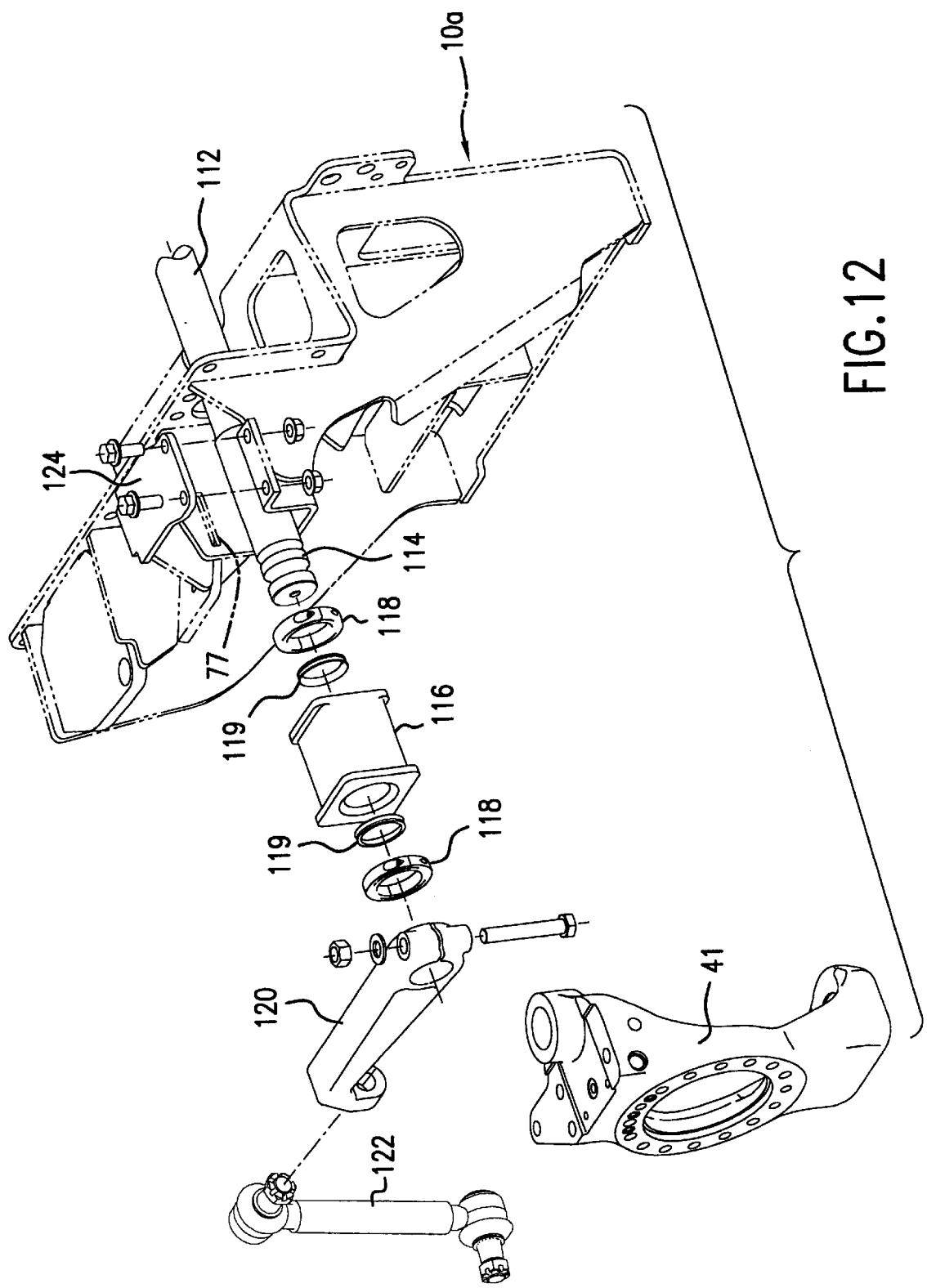
FIG. 12 is an exploded perspective view of an anti-sway bar assembly made in accordance with the present invention.

FIGS. 7, 8 and 9 show a left-hand side plate 10*a* for use with an anti-sway bar. In describing the anti-sway bar equipped left-hand side plate 10*a*, the same reference numerals used to indicate portions of the non anti-sway bar front side plate 10 are used for components which are the same. For example, a coil spring bearing plate 47 extends between an end plate 48 and a gusset 46 to define a pocket 39 for a coil spring (not shown in FIG. 7). The left-hand side plate 10*a* includes upper control arm mounting locations 68 and lower control arm mounting locations 66. Gusset plates 40 and shock absorber bearing plate 42 define a shock absorber pocket 38. However, an element which is part of the left-hand side plate 10*a*, which is not included in the side plate 10 is a bushing pocket 76 and an opening 74 (as shown in FIG. 7) through which extends an anti-sway bar 112, more details of which are shown in FIG. 12. FIGS. 6 and 9 further illustrate an opening 72 that allows for the coil spring and spring guide movement.

Figure 10:
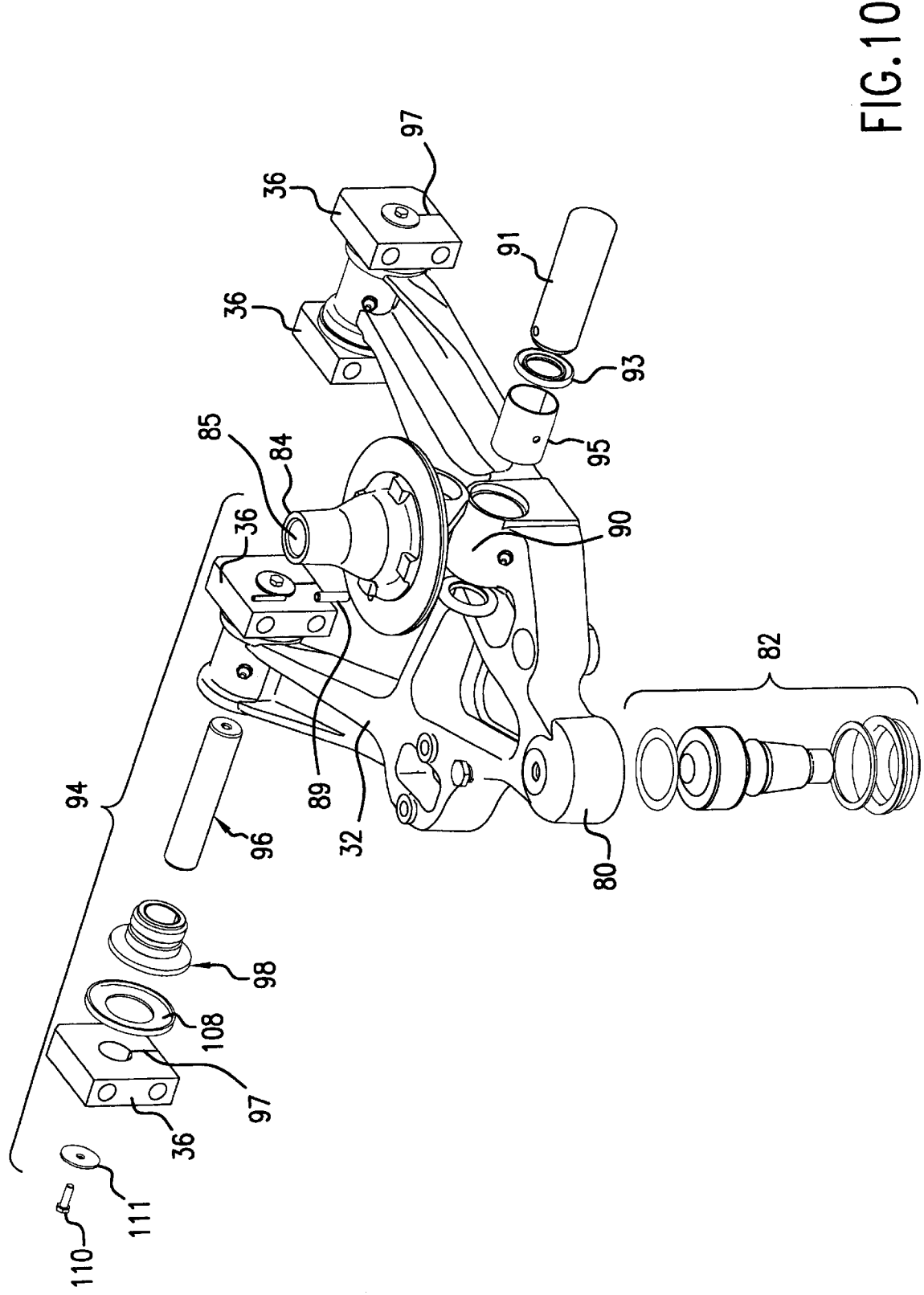
FIG. 10 is an exploded perspective view of a lower control arm constructed in accordance with the present invention.
Figure 11A:
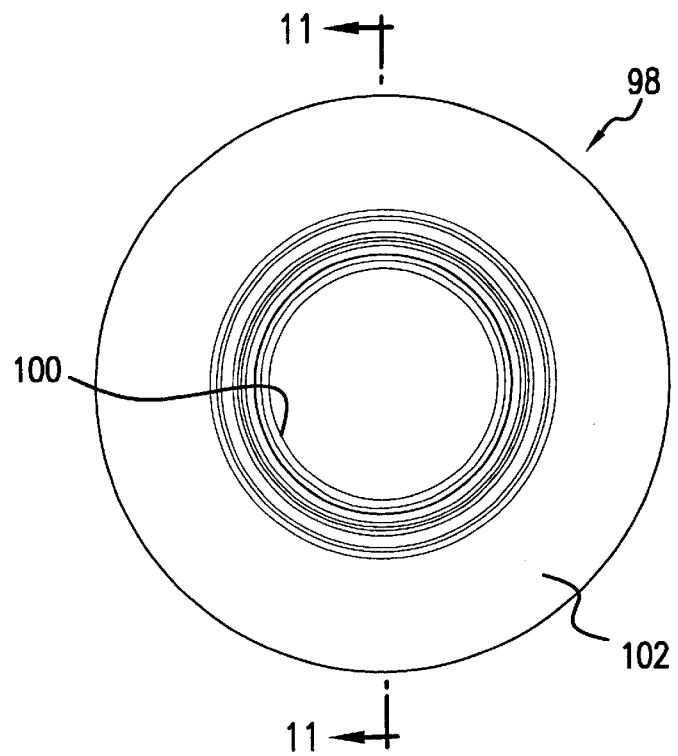
FIG. 11A is a top view of a bushing assembly of the control arm of the present invention.
Figure 11:
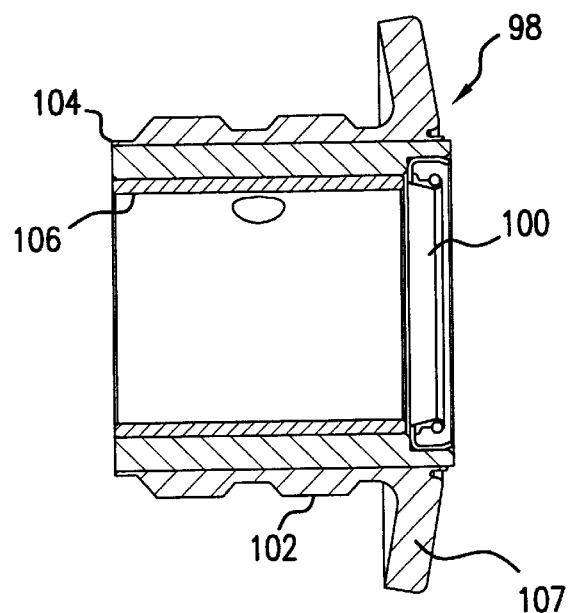
FIG. 11 is a cross-sectional view of a bushing assembly of the control arm of the present invention taken along line 11—11 in FIG. 11A.

FIG. 10 is an exploded view of a lower control arm assembly. The lower control arm 32 has two control arm mounting assemblies 94, one of which is shown in exploded form on the left side of FIG. 10. The control arm mounting assembly 94 includes a pin 96 and two bushing assemblies 98 (more detail of which is shown in FIG. 11). The ends of the pin 96 are clamped by the blocks 36 as the blocks 36 are attached to the lower vertical plate section 56 of a side plate. A thrust washer 108 is disposed between each bushing assembly 98 and a block 36. A screw 110 and washer 111 are used to properly pre-load the bushing assembly 98 before installation. The lower control arm 32 includes a spring mount 90 through which there extends a spring pivot pin 91 and a sleeve bearing 95. A spring seat 84, with a threaded hole 85 for receiving the spring guide 28, straddles the spring mount 90. A small dowel pin 89 retains the spring pivot pin 91 in the spring seat 84, and causes the spring seat 84 to rotate the spring pivot pin 91 within the sleeve bearing 95. A pair of seals 93 prevent contaminants from entering the sleeve bearing 95 within the spring mount 90. FIG. 10 also shows a ball joint assembly 82, which is housed within a socket 80 on the outer end of the lower control arm 32.

FIG. 11 is an enlarged cross-sectional view of the bushing assembly 98 which is part of the control arm mounting assembly 94. The bushing assembly 98 includes an inner sleeve bearing 106, an intermediate sleeve 104 and an outer elastomeric sleeve 102 which has a flange 107 at one end and annular ribs and grooves on the outside surface thereof. A seal 100 engages a shoulder formed on the outer edge of the intermediate sleeve 104. As shown in FIG. 10, the bushing assembly 98 fits snugly into a bore formed at the inside end of each leg of the lower control arm 32. As the block 36 is tightened into position against the lower vertical plate section 56 of a side plate, the pin 96 is gripped by the block 36 as a result of the closing of the gap formed by the slot 97 in the block 36. A slot in each block 36 of a control arm mounting assembly allows for easy removal of a pin 96 from the assembly 94. Arranging the slots 97 so that they face down makes it harder for water and mud to flow into the pin/block joint.

FIG. 12 shows the anti-sway assembly which forms a part of the present invention. An anti-sway bar 112 has a splined end 114 and extends through the opening 74 in the upper vertical plate section 52 of a rear side plate 10*a*. The anti-sway bar 112 is supported by a bushing 116. The bushing 116 is contained in a pocket 76, the top portion of which is formed by a removable plate 124. One end of the plate 124 is inserted into a slot 77 formed in a gusset plate 40, and the other end of the plate 124 is held in place by bolts. A pair of collars 118 maintain the position of the anti-sway bar 112 in the bushing 116. A pair of seals 119 prevent contaminants from entering the bushing 116. The splined end 114 of the anti-sway bar 112 is engaged in and clamped by an end of the arm 120. A vertical link 122 connects an end of the arm 120 to the steering knuckle 41.

Figure 13:
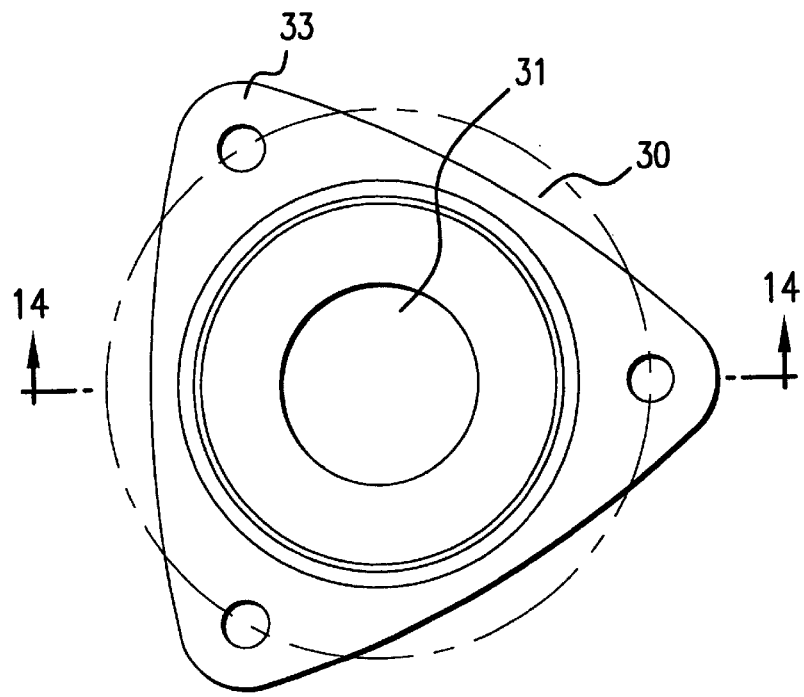
FIG. 13 is an end view of the spring guide bushing shown in FIG. 14, made in accordance with the present invention.
Figure 14:
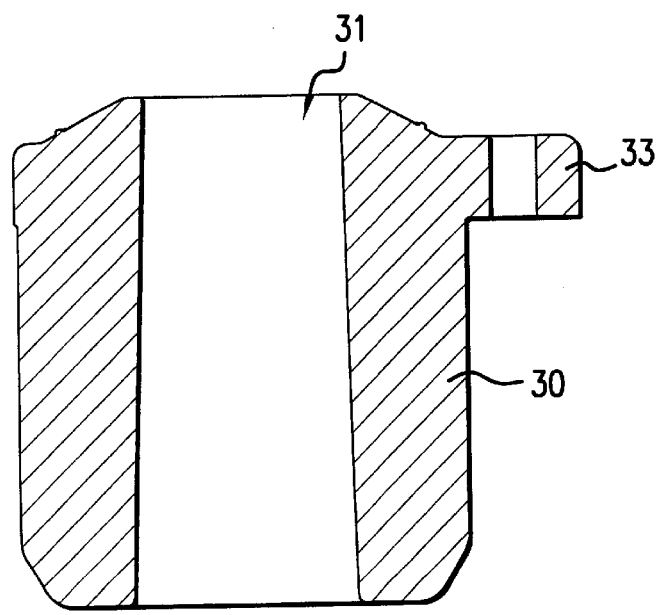
FIG. 14 is a cross-sectional view taken along line 14—14 in FIG. 13 and showing a bushing for a spring guide.
Figure 15:
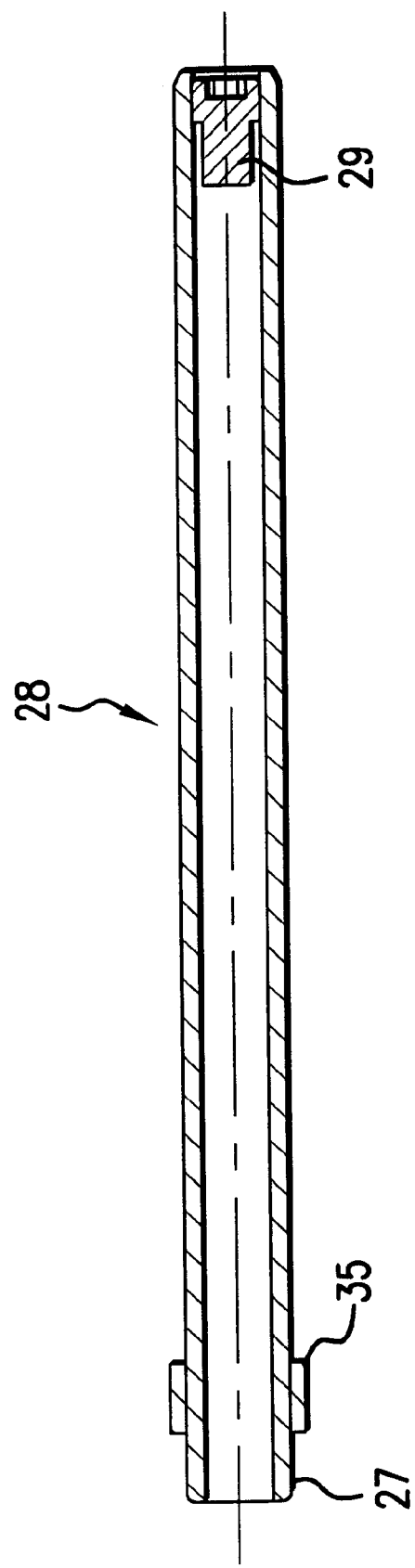
FIG. 15 is a longitudinal cross-section through a spring guide made in accordance with the present invention.

FIGS. 13 and 14 show the spring guide bushing 30 which is attached to the coil spring bearing plate 47 on the front side plates 10 and 12. The spring guide bushing 30 includes a tapered bore or opening 31 through which a spring guide 28 extends. The taper allows the spring guide 28 to articulate slightly within the bushing 30. Mounting ears 33 facilitate the connection of the bushing 30 to the bearing plate 47. The bushing 30 is mounted in the orientation shown in FIG. 2 so that the narrower end of the tapered opening 31 is upward, i.e., the bushing 30 extends down into and through the opening in the bearing plate 47. The rear spring is stable enough by itself not to need a guide. The spring guide 28 is shown in FIG. 15. The spring guide 28 has a threaded end 27 which threads into the threaded hole 85 in the spring seat 84. (See FIG. 10.) A stop 35 is welded to the body of the spring guide 28 to limit the threaded engagement of the treaded end 27 and the spring seat 84. At the opposite end of the spring guide 28, a drive socket 29 is incorporated to facilitate the threaded engagement of the spring guide 28 into the spring seat 84 with a common wrench. It should be noted that the diameter of the spring guide 28 is substantially smaller than inside diameter of the coil spring 26 through which it extends. The result is a non-contact spring guide. The spring guide 28 is free to slide within the tapered opening 31 in the spring guide bushing 30 as the wheel of a vehicle moves up and down. The alignment of the spring seat 84, however, is maintained so that buckling of the coil spring 26 is prevented, even in instances where there is a large compression of the spring as a result of relative movement of the wheel and the frame.

Figure 3:
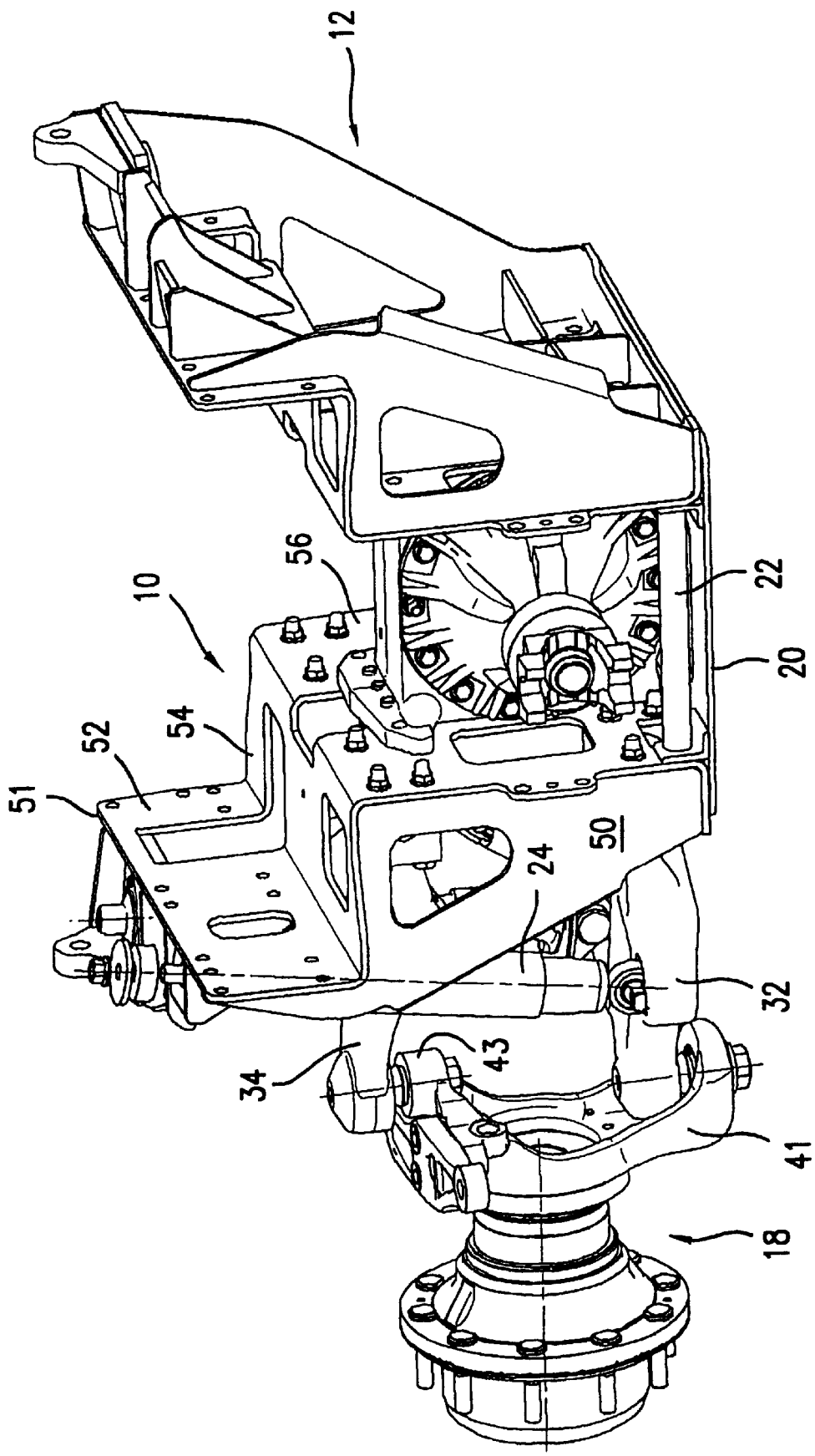
FIG. 3 is a third perspective view of the weldments shown in FIGS. 1 and 2.
Figure 4:
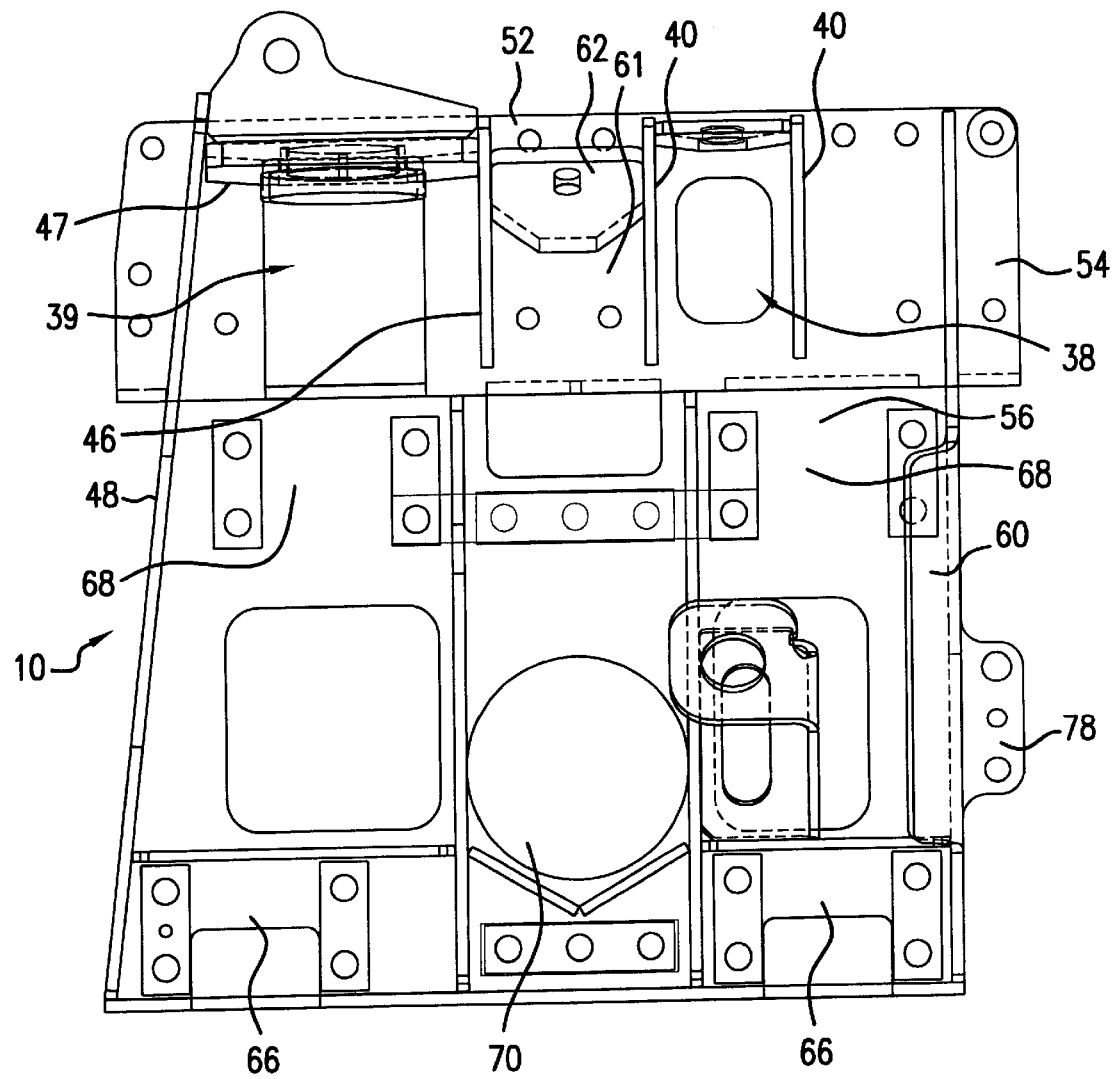
FIG. 4 is a side-elevational view of a front left-hand weldment of the present invention, as configured with no anti-sway bar.
Figure 5:
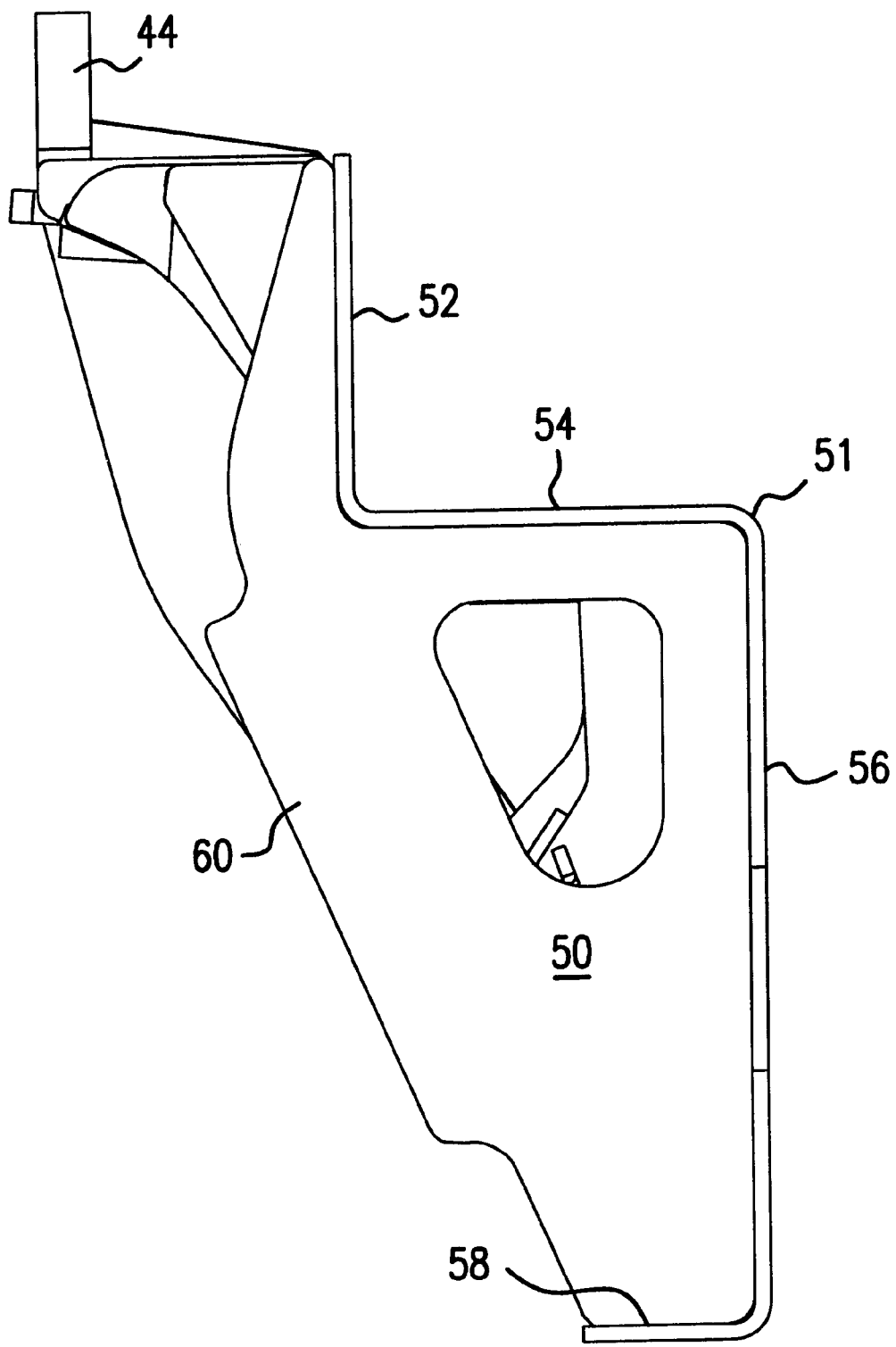
FIG. 5 is an end view of the weldment shown in FIG. 4.
Figure 16:
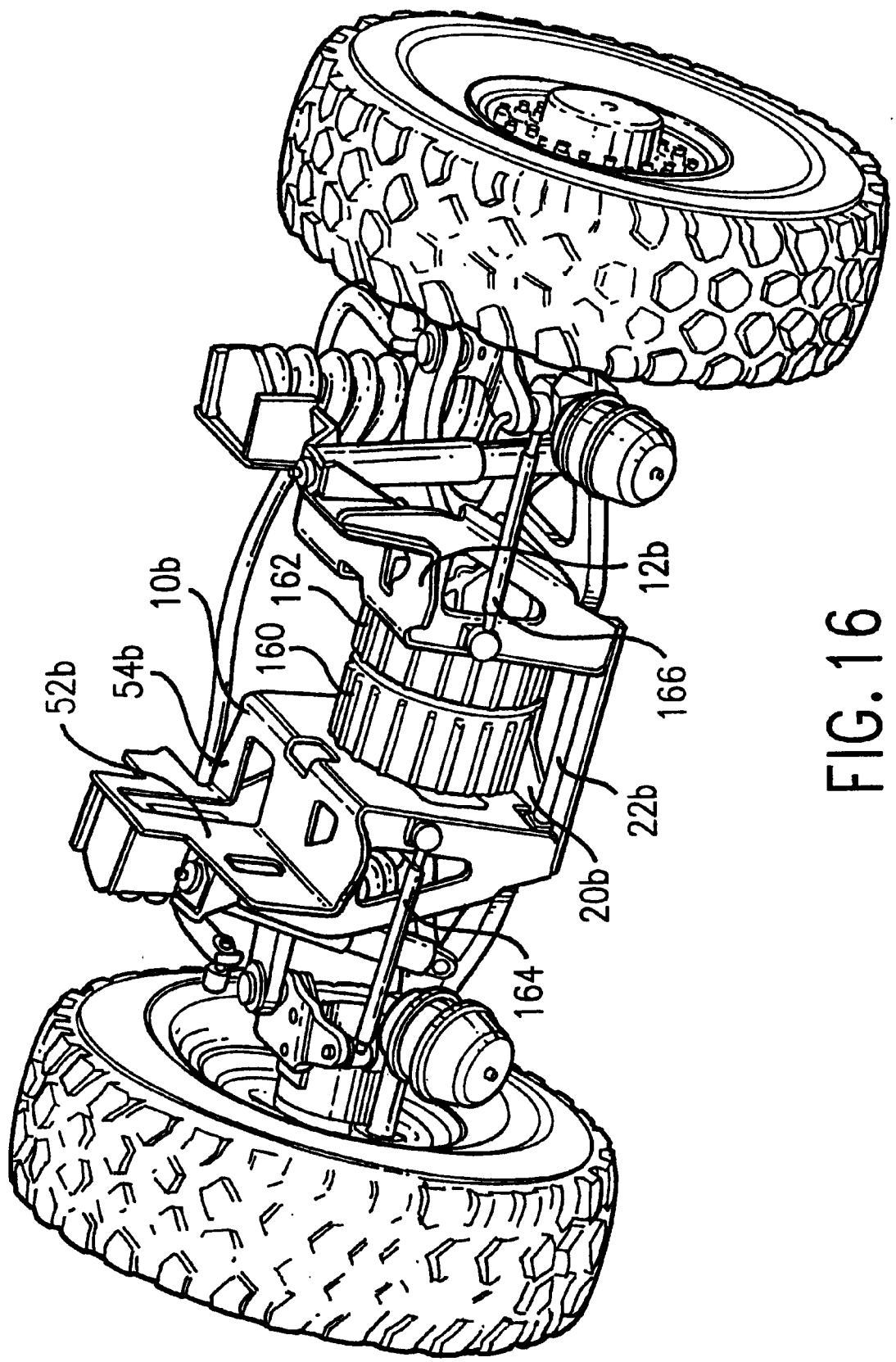
FIG. 16 is a perspective view of a suspension assembly in which electric motors are held between two side plates of the suspension assembly.

FIG. 16 is a perspective view of a suspension assembly in which two elecric motors 160 and 162 are mounted between side plates 10*b* and 12*b*, rather than a more traditional differential as shown in earlier described embodiments of the invention. In describing the suspension assembly with two electric motors mounted between side plates 10*b* and 12*b*, the letter b is used in conjunction with the same reference numerals they correspond to as shown in FIGS. 1–3. This arrangement allows each of the motors to drive one half-shaft and one wheel. In the particular example shown in FIG. 16, the motors directly drive the half-shafts (not shown). To enhance the structural strength of the assembly, which includes the side plates 10*b* and 12*b*, the housings of the motors 160 and 162 may be rigidly connected to one another. However, if larger motors are used a 90 degree drive box may be inserted and the motors mounted in positions in which they are not disposed between the side plates, but are axially offset with respect to one another. Also in the example shown in FIG. 16, the wheels are held in aligned positions relative to the frame by stabilizing bars 164 and 166, although the assembly shown is equally applicable to pairs of wheels which are steered wheels.

Having described a number of features, discoveries and principals embodied in the foregoing examples, it is intended and will be understood by those skilled in the art, that a number of modifications, alternatives and variations thereof may be made while still incorporating the spirit and scope of the inventions as claimed below.

What is claimed is:

1. A frame and suspension assembly for a heavy duty vehicle comprising a weldment forming a first side plate, said first side plate being longitudinally mounted to a first elongated frame member, said first side plate having first and second mounting plates, said first and second mounting plates being generally parallel and being joined by a connecting plate, said weldment further comprising a pair of main buttress plates generally perpendicular to each of said first and second mounting plates and to said connecting plate, said first mounting plate having a first outer pocket and a second outer pocket, one end of a first extendible suspension element being supported in said first pocket and one end of a second extendible suspension element being supported in said second outer pocket;

said weldment providing support for at least one control arm disposed below the first elongated frame member;

said assembly includes a second weldment forming a second side plate, said second side plate being mounted to an elongated frame member, said second side plate having mounting plates, a connecting plate, buttress plates and pockets comprising a substantially mirror image configuration with respect to said first side plate;

said first side plate being rigidly joined to said second side plate, and each of said side plates having an opening for allowing passage of a driveshaft there-through, whereby said first and second side plates form a support for a differential disposed between said side plates with said side plates supporting components of an independent suspension for wheels driven by said differential.

2. A frame and suspension assembly in accordance with claim 1 wherein:

said first and second side plates are joined by a differential housing.

3. A frame and suspension assembly in accordance with claim 1 wherein:

a third outer pocket is carried by an outer surface of said first mounting plate, said third outer pocket being disposed between said first and second outer pockets.

4. A frame and suspension assembly in accordance with claim 1 wherein:

said first outer pocket supports one end of a shock absorber, a second end of said shock absorber being supported by a lower control arm attached to a lower portion of said second mounting plate, and said second outer pocket supporting one end of a suspension coil spring, a second end of said coil spring being mounted to said lower control arm.

5. A frame and suspension assembly for a heavy duty vehicle comprising a weldment forming a first side plate, said first side plate being mounted to a first elongated frame member, said first side plate having first and second mounting plates, said first and second mounting plates being generally parallel and being joined by a connecting plate, a pair of main buttress plates generally perpendicular to each of said first and second mounting plates and to said connecting plate, said first mounting plate having a first outer pocket and a second outer pocket, one end of a first extendible suspension element being supported in said first pocket and one end of a second extendible suspension element being supported in said second outer pocket;

said assembly includes a second weldment forming a second side plate, said second side plate being mounted to an elongated frame member, said second side plate having mounting plates, a connecting plate, buttress plates and pockets comprising a substantially mirror image configuration with respect to said first side plate, said first side plate being rigidly joined to said second side plate, and each of said side plates having an opening for allowing passage of a driveshaft there-through, whereby said first and second side plates form a support for a differential disposed between said side plates with said side plates supporting components of an independent suspension for wheels driven by said differential.

6. A frame and suspension assembly in accordance with claim 5 wherein:
   said first and second side plates are joined by a differential housing.

7. A frame and suspension assembly in accordance with claim 5 wherein:
   a lower control arm is pivotably mounted to a lower portion of said second mounting plate, and an upper control arm is pivotably mounted to an upper portion of said second mounting plate,
   said upper and lower control arms each being pivotably connected to a steer knuckle, and said first and second suspension elements extending from said pockets to said lower control arm.

8. It A frame and suspension assembly in accordance with claim 5 wherein:
   said first and second mounting plates are vertically oriented and laterally offset, and said connecting plate is disposed horizontally between said first and second mounting plates, and said first mounting plate, said second mounting plate and said connecting plate comprise a single stamping.

9. A frame and suspension assembly in accordance with claim 5 which a differential housing bridges said first and second side plates.

10. A frame and suspension assembly for a heavy duty vehicle comprising a weldment forming a first side plate, said first side plate being longitudinally mounted to a first elongated frame member, said first side plate having first and second mounting plates, said first and second mounting plates being generally parallel and being joined by a connecting plate, said weldment further comprising a pair of main buttress plates generally perpendicular to each of said first and second mounting plates and to said connecting plate, said first mounting plate having a first outer pocket and a second outer pocket, one end of a first extendible suspension element being supported in said first pocket and one end of a second extendible suspension element being supported in said second outer pocket;
   said assembly further comprises a lower control arm pivotably mounted to a lower portion of said second mounting plate, and an upper control arm pivotably mounted to an upper portion of said second mounting plate;
   said upper and lower control arms each being pivotably connected to a steering knuckle, and said first and second suspension elements extending from said pockets to said lower control arm.

11. A frame and suspension assembly for a heavy duty vehicle comprising a weldment forming a first side plate, said first side plate being longitudinally mounted to a first elongated frame member, said first side plate having first and second mounting plates, said first and second mounting plates being generally parallel and being joined by a connecting plate, said weldment further comprising a pair of main buttress plates generally perpendicular to each of said first and second mounting plates and to said connecting plate, said first mounting plate having a first outer pocket and a second outer pocket, one end of a first extendible suspension element being supported in said first pocket and one end of a second extendible suspension element being supported in said second outer pocket;
   said weldment providing support for at least one control arm disposed below the first elongated frame member;
   said first and second mounting plates are vertically oriented and laterally offset, and said connecting plate is disposed horizontally between said first and second mounting plates, and said first mounting plate, said second mounting plate and said connecting plate comprise a single stamping.

12. A frame and suspension assembly in accordance with claim 11 which a pair of electric motors are mounted between said first side plate and a second side plate.

13. A frame and suspension assembly for a heavy duty vehicle comprising a weldment forming a first side plate, said first side plate being longitudinally mounted to a first elongated frame member, said first side plate having first and second mounting plates, said first and second mounting plates being generally parallel and being joined by a connecting plate, said weldment further comprising a pair of main buttress plates generally perpendicular to each of said first and second mounting plates and to said connecting plate, said first mounting plate having a first outer pocket and a second outer pocket, one end of a first extendible suspension element being supported in said first pocket and one end of a second extendible suspension element being supported in said second outer pocket;
   said weldment providing support for at least one control arm disposed below the first elongated frame member;
   said assembly includes a second weldment forming a second side plate, said second side plate being mounted to an elongated frame member, said second side plate having mounting plates, a connecting plate, buttress plates and pockets comprising a substantially mirror image configuration with respect to said first side plate;
   said first side plate being rigidly joined to said second side plate, and each of said side plates having an opening for allowing passage of a driveshaft there-through, whereby said first and second side plates form a support for a differential disposed between said side plates with said side plates supporting components of an independent suspension for wheels driven by said differential;
   a differential housing bridges said first and second side plates.

* * * * *

UNITED STATES PATENT AND TRADEMARK OFFICE
CERTIFICATE OF CORRECTION

PATENT NO. : 6,516,914 B1
DATED : February 11, 2003
INVENTOR(S) : Gordon K. Andersen et al.

It is certified that error appears in the above-identified patent and that said Letters Patent is hereby corrected as shown below:

<u>Column 7,</u>
Line 15, before "A frame" delete "It".
Line 24, after "claim 5" insert -- in --.

Signed and Sealed this

Tenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,516,914 B1
DATED : February 11, 2003
INVENTOR(S) : Gordon K. Andersen et al.

It is certified that error appears in the above-identified patent and that said Letters Patent is hereby corrected as shown below:

Title page,
Item [57], ABSTRACT,
Line 10, please delete "," after "of each axle."

Column 1,
Line 26, please replace "beteween" with -- between --.
Line 66, please replace "rectilinerally" with -- rectilinearly --.

Column 2,
Line 10, please replace "tie" with -- the --.
Line 29, please replace "," with -- ; --.

Column 3,
Line 35, please replace "halfshaft" with -- half-shaft --.

Column 5,
Line 15, please replace "treaded" with -- threaded --.
Line 20, please insert -- the -- after "smaller than."
Line 30, please replace "elecric" with -- electric --.

Column 8,
Line 19, please insert -- in -- before "which."

Signed and Sealed this

Thirteenth Day of April, 2004

JON W. DUDAS
*Acting Director of the United States Patent and Trademark Office*